Dec. 17, 1940.   W. M. SCHWEICKART ET AL   2,224,991
SCREW CONVEYER
Filed March 9, 1940   2 Sheets-Sheet 1
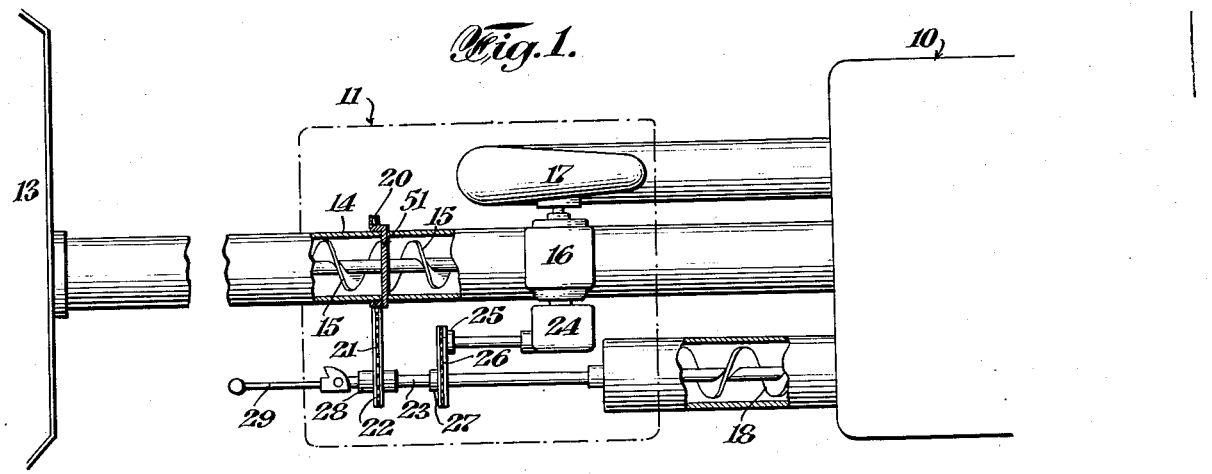
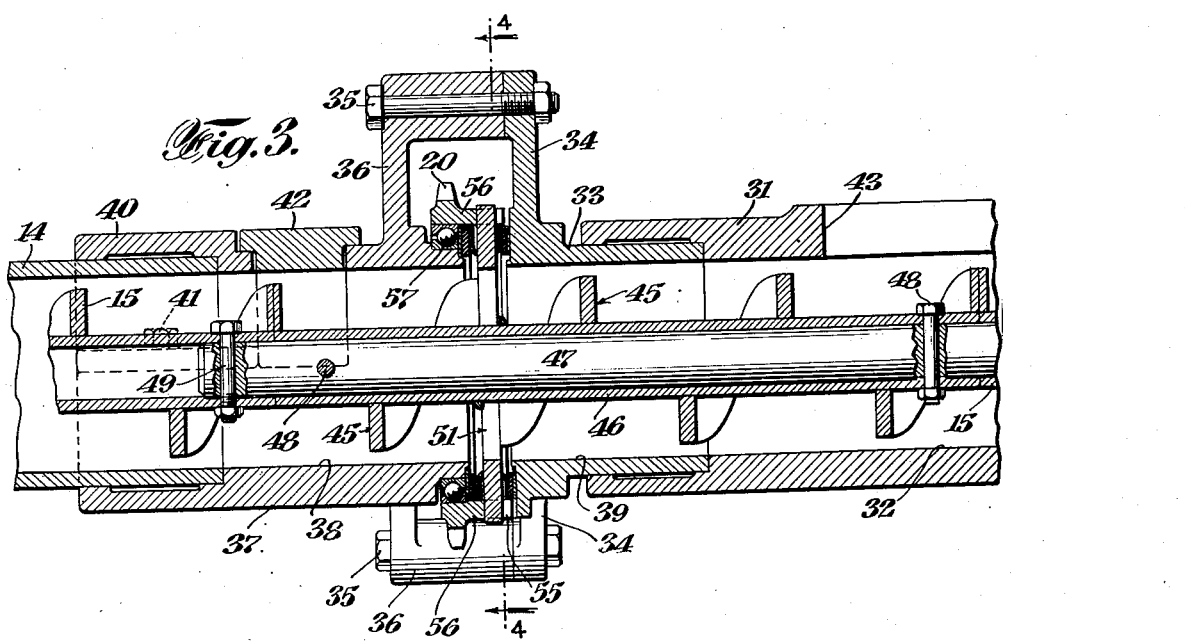
INVENTORS
William M. Schweickart and
Fred J. Julyan
BY
Edwards, Bower & Pool
ATTORNEYS Dec. 17, 1940. W. M. SCHWEICKART ET AL 2,224,991
SCREW CONVEYER
Filed March 9, 1940 2 Sheets-Sheet 2
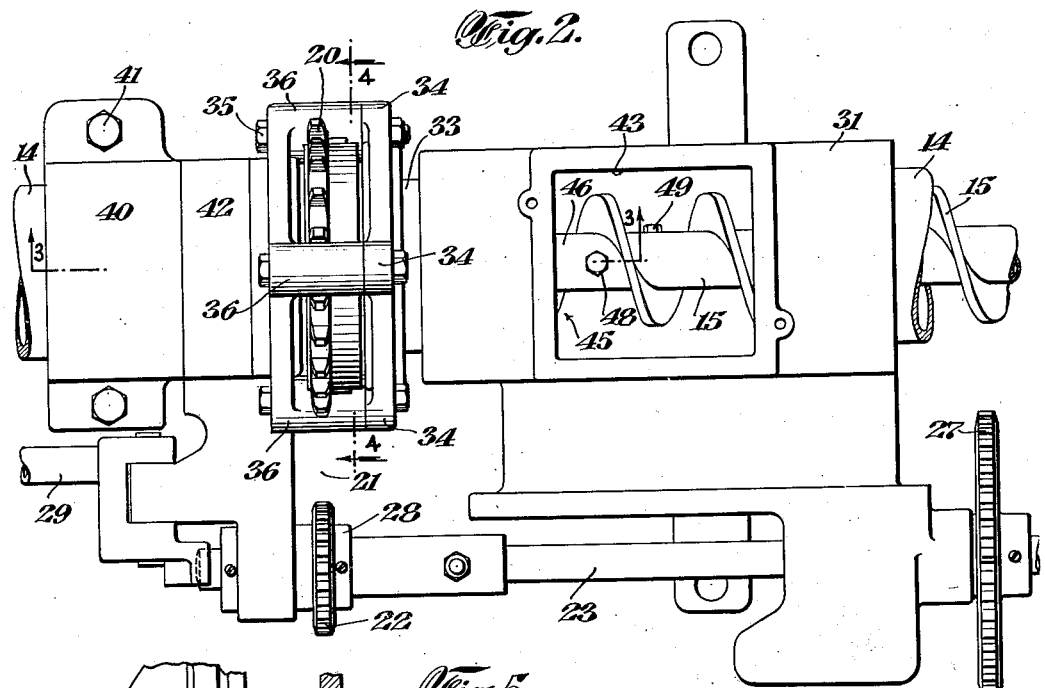
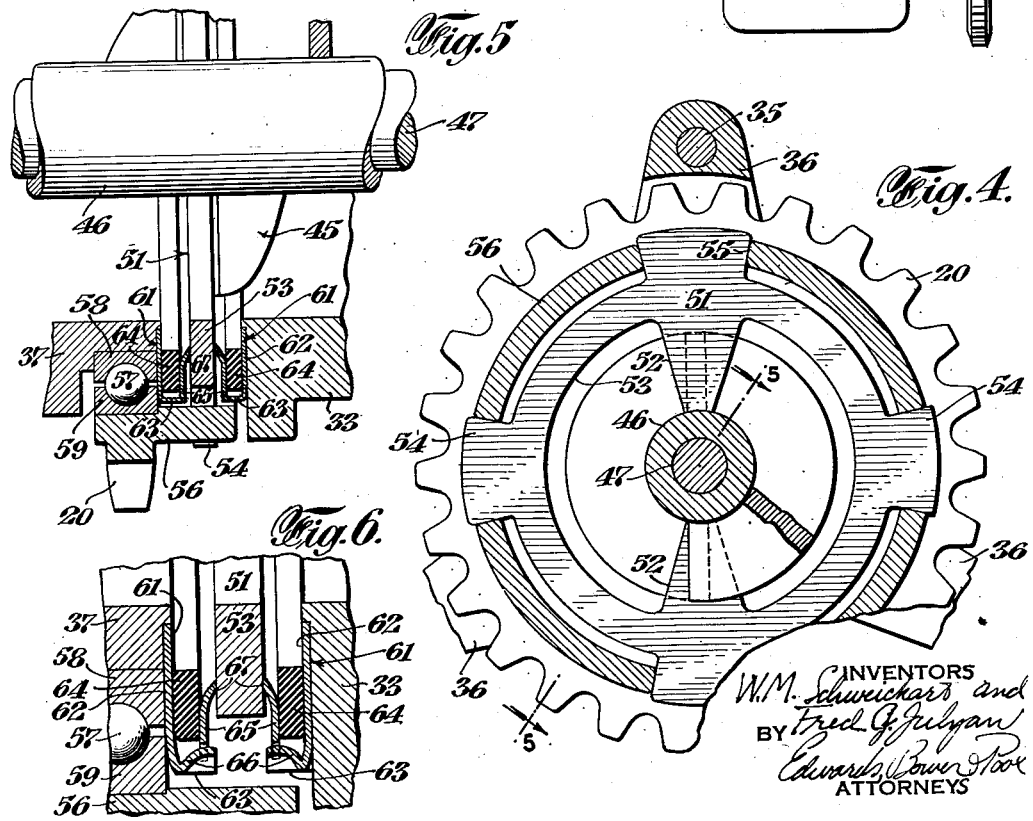
INVENTORS
W. M. Schweickart and
Fred G. Julyan
BY
Edwards, Bower & Rox
ATTORNEYS Patented Dec. 17, 1940

2,224,991

UNITED STATES PATENT OFFICE 2,224,991

SCREW CONVEYER

William M. Schweickart and Fred G. Julyan, Euclid, Ohio, assignors to Pocohontas Fuel Company Incorporated, New York, N. Y., a corporation of Virginia Application March 9, 1940, Serial No. 323,128

3 Claims. (Cl. 198—213)

This invention relates to screw conveyers and particularly to screw conveyers used to convey particles of coal or other solid fuel to an automatic fuel burner or stoker.

The object of the invention is to provide means for driving a screw conveyer intermediate its ends, otherwise known as a ring drive, which is simple, effective, inexpensive and durable.

Referring to the drawings:

Fig. 1 is a diagrammatic plan view of a stoker installation embodying the invention;

Fig. 2 is a plan view of the same showing the ring drive of the coal screw together with associated apparatus;

Fig. 3 is a vertical sectional view along the axis of the coal screw, indicated by the line 3—3 of Fig. 2;

Fig. 4 is a transverse sectional view of the ring drive, taken along the line 4—4 of Figs. 2 and 3;

Fig. 5 is an enlarged sectional view taken along the line 5—5 of Fig. 4; and

Fig. 6 is a further enlarged sectional view showing details of the seal.

Referring to Fig. 1, the furnace diagrammatically indicated at 10 is equipped with an automatic coal burner or stoker having a driving motor and other equipment within a housing diagrammatically indicated at 11. The stoker is of the binfeed type, that is the stoker automatically conveys the coal from the bin 13 to the furnace 10, the coal being conveyed within a coal feed tube 14 by means of a coal screw 15. In the stoker shown the coal screw is driven by a motor 16 located within the housing 11, this motor also driving a blower 17 for supplying the coal burner with air under pressure. Motor 16 also drives the ash screw 18 of an ash-removing conveyer which discharges the ashes into a container positioned in a covered pit beneath the floor. The coal and ashes are thus handled automatically and the respective containers thereof are concealed.

In the stoker shown the coal screw is driven intermediate its ends. This is effected by a "ring drive" shown in greater detail in Figs. 2-6 inclusive. Sprocket teeth 20 of the ring drive, positioned outside the coal feed tube 14, but connected to the coal screw 15, is driven by a chain 21 which in turn is driven by a sprocket 22 mounted upon and releasably secured to shaft 23, this shaft conveniently being an extension of the shaft of the ash screw 18.

Shaft 23 is driven by motor 16 through reduction gearing 24, sprocket 25, chain 26 and sprocket 27, the latter sprocket being mounted upon and secured to shaft 23. A ball clutch 28 is preferably provided between sprocket 22 and shaft 23 to releasably connect the sprocket with the shaft. This clutch 28, the details of which it is believed unnecessary to describe, is controlled by a lever 29 extending outside the housing so that when this lever is raised, the sprocket 22 is disconnected from shaft 23 and the motor 16 and blower 17 rotate without rotating the coal screw 15.

Referring now to Figs. 2-6, inclusive, the coal feed tube 14 is interrupted intermediate its ends as it passes through housing 11. The housing end of the portion of the coal feed tube which extends into furnace is fitted into a base member 31 which has a cylindrical passageway 32 in continuation of the coal feed tube. At the end of base 31 further removed from the furnace a tubular member 33 is fitted therein, this member being aligned with the coal feed tube 14 and passageway 32. Tubular member 33 is provided with ears 34 detachably secured, as by bolts 35, to ears 36 on a coal feed passage extension casing 37. The opposite end of this casing is fitted over the housing end of the portion of the coal feed tube which extends into the bin. The interior passageway 38 of casing 37 is aligned with passageway 39 of tubular member 33. Preferably the upper half 40 of casing 37 fitting over the housing end of coal feed tube 14 is removable, being secured to the lower half by suitable bolts 41. An inspection opening in the casing 37 may be provided, this opening being covered by a removable cap 42. Also, base 31 is preferably provided with an access opening 43, normally covered by a cover, not shown.

The coal screw 15 is interrupted intermediate its ends as it passes through the housing 11, the housing end of the portion of the coal screw which extends into the bin being within the casing 37 and the housing end of the portion of the coal screw which extends into the furnace being within the passageway 32. Between these ends of the coal screw is interposed a short length of a connecting screw 45 having flights similar to those of the coal screw in pitch and diameter, and merging therewith at each end of the connecting screw. The shaft portion 46 of screw 45 is hollow, within which is positioned a rod 47, this rod being secured to shaft 46 near its ends by the bolts 48, one at each end. Rod 47 is somewhat longer than the shaft 46 so that it projects into the hollow ends of the abutting sections of the coal screw 15, where such projecting ends of rod 47 are secured to the coal screw 15 by bolts 49.

Intermediate the ends of screw 45 a spider 51 is mounted transverse to the axis of the screw. Spider 51, preferably formed from sheet stock by stamping, has two narrow radial arms 52 extending from the exterior of the shaft 46 outwardly to a radius substantially equal to that of the passageways 38, 39, where the arms merge with an annular ring portion 53. Arms 52 may, if desired, be welded to shaft 46. Spider 51 also has a plurality of lugs 54 projecting radially outward from the annular portion 53. The flights of screw 45 are interrupted by the spider arms 52, the screw flight at one side of the spider terminating against one spider arm 52 and the screw flight at the other side of the spider terminating against the other spider arm 52, with the flights secured, as by welding, to the respective spider arms. As a result of this construction the spider 51 is securely fastened to the coal screw 15 with a minimum obstruction to the flow of coal along the coal tube 14.

The adjacent annular ends of tubular member 33 and casing 37 are separated to form a peripheral slot in the coal tube 14. The annular ring portion 53 of spider 51 is positioned in this slot with its lugs 54 projecting radially outward beyond the end of casing 37. These lugs 54 fit into recesses 55 formed in an annular sprocket ring 56 that is rotatably mounted upon the end of casing 37, preferably by an anti-friction bearing which restricts the axial movement of ring 56. As shown, this bearing consists of ball bearings 57 contained within inner and outer annular ball races 58 and 59, the former secured to casing 37, and the latter secured to ring 56. Sprocket ring 56 has radially projecting teeth 20 formed thereon, which, as previously explained, are driven by the stoker motor 16 through chain 21.

The annular ring portion 56 of spider 51 does not completely fill the slot between the adjacent annular ends of tubular member 33 and casing 37, the ring portion being spaced from both the member 33 and casing 37. To prevent the escape or leakage of coal outwardly through these spaces in the ring drive mechanism a seal is provided. In the embodiment shown this seal comprises a pair of annular cups 61, preferably of steel and formed by spinning or stamping, each cup having a substantially radial face 62, and a peripheral flange 63. The cups 61 are mounted at opposite sides of the slots in the coal tube 14 with their flanges directed toward each other, one cup having its radial face 62 engaging the end of casing 37 and the inner ball race 58 secured thereto, and the other cup having its radial face 62 engaging the end of member 33. The outer portions of the radial faces 62 are slightly dished, as shown in Fig. 6, so that they do not engage the surfaces thereunder, and particularly so that the outer ball race 59 secured to the sprocket ring 56 is spaced from the radial face 62 engaging the inner ball race 58.

Within each cup 61 is positioned a resilient ring 64, such as rubber, having one of its radial faces engaging the radial face of the cup over a substantial portion thereof. Engaging the other radial face of each resilient ring 64 is a flexible seal ring 65. The seal rings 65, preferably of bronze are fitted within the flanges 63 of their respective cups 61 and are interlocked therewith to prevent relative rotation. As shown in Fig. 6, this interlocking consists of one or more indentations 66 in the cup flange 63 and corresponding notches in the outer periphery of the seal ring 65. The inner portion of the seal ring 65 is dished or cupped, as at 67, to produce a thin line of contact between the seal ring and the adjacent flat radial surface of the spider ring portion 53. The seal ring cup 67 is preferably formed by pressing a flat flexible bronze ring upon a conically shaped die, with the amount of cupping insufficient to impart stiffness to the ring. A cupping angle in the neighborhood of 15° has been found to provide excellent flexibility and a narrow line of contact.

When the ring drive is assembled and the tubular member 33 and casing 37 secured together by the bolts 35 extending through their respective ears 34 and 36, the cups 67 of the seal rings 65 engage the spider 51 at opposite sides of its ring portion 53 and thus effectively prevent the leakage of coal, including the fines and other minute particles present therein. The flexibility of the seal ring 65 and of the rubber ring 64 in back of it permits the seal to adjust itself readily to differences in sizes of parts and to other irregularities so that the parts of the ring drive may thus be made without the necessity for working to close tolerances and thus be made with a minimum of expense. In this connection, it has been mentioned that spider 51 and the rings 61 and 65 may be stamped and the spider 51 secured to the connecting screw 45 by welding. As the engagement of the seal ring cup 67 and spider 51 is along a narrow line of contact, and the contact pressure is relatively small, the friction caused by the seal of the ring drive is small, and the wear of the relatively moving parts thereof negligible. The seal ring 65 is non-rotating, being interlocked with the flanged cup 61 which is frictionally held against rotation. The rubber ring 64 is non-rotating, is subjected only to compression and is retained in place by the flanges 63 of cup 61. The wear of the seal is thus confined to the cupped portions 67 of bronze rings 65 and as this wear is negligible, the seal is durable.

The resulting ring drive mechanism is thus simple in construction, inexpensive to make, relieves the coal screw of unnecessary strains, provides a support for the coal screw intermediate its ends, provides a minimum of impediment to the flow of coal, dissipates a negligible amount of energy, provides an effective seal to prevent leakage of coal and has a long life.

This application is a continuation in part of our application for Stokers, Serial No. 161,494, filed August 28, 1937.

We claim:

1. In a ring drive apparatus for a screw conveyer enclosed within a conveying tube the combination with a tube containing a rotatable feed screw and having an annular opening, of an annular drive ring positioned on the outside of the tube to one side of said opening and having outer radially projecting driving teeth and an anti-friction bearing between the ring and the tube located in the radial plane of said driving teeth and acting to retain the ring against axial displacement, a spider secured to said screw and extending outwardly through said annular slot, means securing said spider to said drive ring, and sealing means sealing the space between each side of said spider and the adjacent end surface of the conveying tube to prevent leakage through said spaces.

2. The apparatus as set forth in claim 1 in which the sealing means at each side of the spider comprises an annular cup having a substantially radial face and a peripheral flange mounted upon the coal tube and in said slot with the flange of said cup directed toward said spider, a flexible seal ring fitted within the flange of said cup and interlocked thereto to prevent relative rotation, the seal ring being slightly cupped at its inner end to produce a thin line of contact with the spider, and a resilient ring positioned between said seal ring and the radial face of said cup.

3. In a ring drive apparatus for driving intermediate its ends the screw of a screw conveyer enclosed within a conveying tube, the combination with a spider secured to said screw extending outwardly through a peripheral slot in said conveying tube and laterally spaced from one side thereof, of means sealing the space between said spider and the side of said slot to prevent leakage through said space, said sealing means comprising an annular cup having a substantially radial face and a peripheral flange mounted in said slot with the flange of said cup directed toward said spider, a flexible seal ring fitted within the flange of said cup and interlocked thereto to prevent relative rotation, the seal ring being slightly cupped at its inner end to produce a thin line of contact with the spider, and a resilient ring positioned between said seal ring and the radial face of said cup.

WILLIAM M. SCHWEICKART.
FRED G. JULYAN.